US012696182B2

(12) United States Patent
Fodor et al.

(10) Patent No.: US 12,696,182 B2
(45) Date of Patent: Jul. 28, 2026

(54) POSITIONING-TRIGGERED INTERFACE SELECTION

(71) Applicant: Telefonaktiebolaget LM Ericsson (publ), Stockholm (SE)

(72) Inventors: Gabor Fodor, Hasselby (SE); Julia Vinogradova, Helsinki (FI); Peter Hammarberg, Mölndal (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 511 days.

(21) Appl. No.: 18/019,344

(22) PCT Filed: Aug. 4, 2020

(86) PCT No.: PCT/SE2020/050763
§ 371 (c)(1),
(2) Date: Feb. 2, 2023

(87) PCT Pub. No.: WO2022/031194
PCT Pub. Date: Feb. 10, 2022

(65) Prior Publication Data
US 2023/0309006 A1 Sep. 28, 2023

(51) Int. Cl.
*H04W 48/18* (2009.01)
*H04W 64/00* (2009.01)
*H04W 92/18* (2009.01)

(52) U.S. Cl.
CPC ........... *H04W 48/18* (2013.01); *H04W 64/00* (2013.01); *H04W 92/18* (2013.01)

(58) Field of Classification Search
CPC ..... H04W 48/18; H04W 64/00; H04W 76/14; H04W 92/18
USPC ....... 370/254, 248, 338, 329, 331, 447, 337, 370/242, 252
See application file for complete search history.

(56) References Cited

U.S. PATENT DOCUMENTS

| | | | |
|---|---|---|---|
| 7,455,225 B1 * | 11/2008 | Hadfield ................ | G07C 5/085 235/444 |
| 11,451,943 B2 * | 9/2022 | Mach .................... | H04W 24/02 |

(Continued)

FOREIGN PATENT DOCUMENTS

WO 2020064527 A1 4/2020

OTHER PUBLICATIONS

PCT International Search Report and Written Opinion mailed Apr. 23, 2021 for International Application No. PCT/SE2020/050763, 11 pages.
Vivo Mobile Communication Co. LTD, "Served by and Not Served by" Clarification, 3GPP TSG-SA2 Meeting #137-E, S2-2001875 V16.1.0, Feb. 24, 2020, 5 pages.
3GPP; Technical Specification Group Core Network and Terminals, "User Equipment (UE) to V2X Control Function (Release 14)", 3GPP TS 24.386 V14.1.0 (Jun. 2017), France, 33 pages.

(Continued)

*Primary Examiner* — Joseph Arevalo
(74) *Attorney, Agent, or Firm* — Sage Patent Group

(57) ABSTRACT

A wireless device (WD) and method for a WD for selecting a communication interface is provided. The WD supports communication with a network node. The method includes determining a WD positioning information status and a cellular coverage status and determining a WD state based on the determined WD positioning information status and the cellular coverage status. The method further includes transmitting a position information based on the determined WD state and selecting a communication interface based at least in part on the determined WD state. A network node and methods for the network node are also provided.

16 Claims, 6 Drawing Sheets

(56) References Cited

U.S. PATENT DOCUMENTS

| | | | |
|---|---|---|---|
| 2005/0202780 A1 * | 9/2005 | Kall | H04W 8/10 |
| | | | 455/1 |
| 2016/0360432 A1 * | 12/2016 | Graffagnino | H04W 24/02 |
| 2017/0019833 A1 * | 1/2017 | Luo | H04W 40/02 |
| 2017/0215098 A1 * | 7/2017 | Huang | H04W 24/10 |
| 2018/0205608 A1 * | 7/2018 | Robinson | H04W 76/27 |
| 2019/0090107 A1 | 3/2019 | Taehun et al. | |
| 2019/0356451 A1 * | 11/2019 | Zhang | H04W 52/383 |
| 2020/0059917 A1 * | 2/2020 | Feng | H04W 72/51 |
| 2021/0068079 A1 * | 3/2021 | Sahin | H04W 72/51 |
| 2021/0400739 A1 * | 12/2021 | Nakano | H04M 11/00 |
| 2023/0014303 A1 * | 1/2023 | Di Girolamo | H04W 72/20 |

OTHER PUBLICATIONS

Fodor, Gabor et al., "Design Aspects of Network Assisted D2D Communications", IEEE Communications Magazine, Mar. 2012, 9 pages (170-178).

Fodor, Gabor et al., "D2D Communications for National Security and Public Safety Services", IEEE Access, Jan. 2014, 13 pages.

Fodor, Gabor et al., "Supporting Enhanced Vehicle-to-Everything Services by LTE Release 15 Systems", IEEE Communications Standards Magazine, Mar. 2019, 13 pages.

Belleschi, Marco et al., "Performance Analysis of a Distributed Resource Allocation Scheme for D2D Communications", IEEE Globecom, Dec. 2011, 6 pages.

* cited by examiner

Shadowing object

LoS

No
LoS

Out of
cellular
Coverage,
but
In GNSS
coverage

POSITIONING-TRIGGERED INTERFACE SELECTION

CROSS-REFERENCE TO RELATED APPLICATIONS

This application is a 35 U.S.C. § 371 national stage application for International Application No. PCT/SE2020/050763, entitled "POSITIONING-TRIGGERED INTERFACE SELECTION", filed on Aug. 4, 2020, assigned to the assignee hereof, and expressly incorporated herein by reference.

TECHNICAL FIELD

Wireless communication networks and more particularly to methods and apparatuses for positioning-triggered interface selection.

BACKGROUND

Wireless communication networks, such as those provided based on standards promulgated by the 3rd Generation Partnership Project (3GPP), e.g., New Radio (NR) (NR is also referred to as 5G), support at least a network node and more than one wireless device (WD). Device-to-Device (D2D) communication, i.e., direct communication between WDs, is also supported. In these environments, the management of WD interfaces may be useful in order to obtain positioning information related to the WDs, especially when cellular coverage is lost, or traditional positioning-determining sources are not available.

With respect to D2D, cellular-network-assisted D2D communications in both licensed and unlicensed spectrum bands can increase spectral efficiency, energy efficiency and may also reduce latency. Recognizing a technology potential, both the Institute of Electrical and Electronics Engineers (IEEE) and the 3GPP have defined technology-specific enablers that allow infrastructure and consumer products to operate D2D protocols. In 3GPP, for example, technical specifications released since Rel-12 support sidelink communications for national safety and public safety and support vehicular communications as well.

An aspect of D2D and sidelink communications is mode selection, which is referred to as interface selection in 3GPP. Interface selection refers to the mechanism whereby a WD selects between cellular mode communications through uplink/downlink cellular interfaces of the WD and communications over the sidelink through a WD sidelink (also called PC5 interface). Mode selection or interface selection is known to have a large impact on spectral and energy efficiency as well as on latency and battery consumption.

With respect to vehicle-to-anything (V2X) communication, positioning of a vehicle is a vital part of many V2X use cases or services, such as remote control, lane crossing, autonomous parking, pre-crash warning, traffic congestion warning, instant road hazard warning, emergency break, platooning, and speed warning. Some of the V2X use cases require much higher accuracy positioning than can be achieved through positioning based on Radio Access Technology (RAT)(with reasonable deployment assumptions) based on 3GPP Rel.-16. For instance, the positioning requirement for human-assisted, remote driving demands high accuracy positioning, which is around 10 cm. In order to achieve the high positioning accuracy, assuming that the position is calculated by a network entity, the vehicle may need to share information obtained using sensors that are onboard the vehicle.

3GPP NR is positioned to provide added value in terms of enhanced location capabilities. Operation in low frequency bands (below 6 GHz) and high frequency bands (above 6 GHz) and utilization of massive antenna arrays provide additional degrees of freedom to substantially improve positioning accuracy by exploiting spatial and angular domains of propagation channel in combination with time measurements. The possibility to use wide signal bandwidth in low and especially in high bands brings new performance bounds for well-known positioning techniques that are based on observed time difference of arrival (OTDOA) and uplink time difference of arrival (UTDOA), for positioning techniques based on cell-ID (CID), and for positioning techniques based on enhanced cell-ID (E-CID). The recent advances in massive antenna systems, e.g., massive Multiple-Input Multiple-Output (MIMO), can provide additional degrees of freedom to enable obtaining more accurate user location.

Specifically, Rel-16 of NR introduced support for OTDOA where a reference signal for positioning is being specified. Further E-CID positioning method is expected to exploit beam and massive antenna technologies, such as by easily deriving angles of arrival/departure (AoA/AoD).

FIG. 1 shows an example arrangement in which vehicles and vulnerable road users may be in or out of cellular/GNSS coverage (e.g., due to lack of line of sight (LoS), or shadowing objects) and may have accurate or outdated positioning information. When vehicles and vulnerable road users (VRU) are out of cellular and Global Navigation Satellite System (GNSS) coverage, the vehicles, the VRUs, and the network lack appropriate positioning information to provide positioning dependent services (e.g., cooperative maneuvering, VRU detection/warning, lane merge assistance). In other words, providing services that depend on information concerning V2X positioning in situations in which at least some of the participants do not have up-to-date positioning becomes difficult, if not impossible.

More specifically, for network-assisted V2X services, the existing solutions do not facilitate an interplay between a network node (eNB, gNB) and WDs unless network coverage is available. In other words, existing network-assisted solutions fail in situations, in which some of the WDs are out of network coverage.

A position-dependent solution should take advantage of cellular and GNSS coverage when available and continue providing positioning information with a graceful degradation when out of cellular/GNSS coverage. Existing solutions for positioning and position-dependent V2X services fail to provide positioning information in these conditions.

SUMMARY

Some embodiments of the present disclosure advantageously provide methods and apparatuses related to positioning-triggered interface selection.

According to one aspect of the present disclosure, a method for a WD for selecting a communication interface is provided. The WD supports communication with a network node. The method includes determining a WD positioning information status and a cellular coverage status. A WD state is determined based on the determined WD positioning information status and the cellular coverage status. A position information is transmitted based on the determined WD state. The method also includes selecting the communication interface based at least in part on the determined WD state.

In some embodiments of this aspect, a configuration is received, and the configuration specifies how the WD positioning information status, the cellular coverage status, and the WD state are determined. In addition, a state information table is created based at least on the received configuration. In other embodiments, the configuration further specifies transmitting the position information in accordance with a reporting mode selected from one of single-report request, periodic, event triggered, and event-triggered-periodic. In yet another embodiment of this aspect, the received configuration is one of a configuration received from the network node, a configuration based at least on subscription data, and a configuration based at least on preconfigured data.

In some embodiments of this aspect, the cellular coverage status is one of in coverage and out of coverage, and the WD positioning information status is one of up-to-date and obsolete. In another embodiment of this aspect, the determined WD state is state 1 when the cellular coverage status is in coverage and the WD positioning information status is up-to-date. The determined WD state is state 2 when the cellular coverage status is in coverage and the WD positioning information status is obsolete. The determined WD state is state 3 when the cellular coverage status is out of coverage and the WD positioning information status is up-to-date. The determined WD state is state 4 when the cellular coverage status is out of coverage and the WD positioning information status is obsolete.

In one embodiment of this aspect, transmitting the position information further includes when the WD state is state 1, transmitting a position report including a WD position. When the WD state is state 2, a position warning and a network support request is transmitted. When the WD state is state 3, an estimated WD position using a Mode 2 broadcast is transmitted, and positions of surrounding wireless devices are scanning for. When the WD state is state 4, a warning signal using a Mode 2 broadcast is transmitted. The warning signal indicates that the WD position is unknown.

In some embodiments of this aspect, selecting the communication interface further includes, when the WD state is state 1, selecting as the communication interface one of a cellular interface (Uu), a Direct Communication (PC5) Mode 1 interface, and a PC5 Mode 2 interface. The communication interface selection is based at least in part on one of a received selection made by the network node and a selection made by the WD. The communication interface is selected to transmit at least the position report. When the WD state is state 2, one of a Uu interface, a PC5 Mode 1 interface, and a PC5 Mode 2 interface is selected as the communication interface. The communication interface selection is based at least in part on one of a received selection made by the network node and a selection made by the WD. The communication interface is selected to transmit at least the position warning and the network support request. When the WD state is state 3, a PC5 Mode 2 interface is selected as the communication interface. The communication interface selection is made by the WD. The communication interface is selected to transmit at least the estimated WD position using a Mode 2 broadcast and to scan for positions of surrounding wireless devices. When the WD state is state 4, a PC5 Mode 2 interface is selected as the communication interface. The communication interface selection is made by the WD. The communication interface is selected to transmit at least the warning signal indicating that the WD position is unknown using a Mode 2 broadcast.

In some embodiments of this aspect, the network support request includes a request to the network node to transmit one of a Down Link Positioning Reference Signal (DL PRS) and Real-Time Kinematic (RTK) assistance data. In some other embodiments of this aspect, the WD position is determined based at least on information provided by a position-determining source including at least one of a DL PRS, a Global Navigation Satellite System (GNSS), and at least one WD sensor. In some other embodiments of this aspect, the transmitted position information further includes the WD state and the position-determining source utilized to determine the WD position. In some embodiments of this aspect, determining the cellular coverage status is based at least in part on a predefined threshold. In some embodiments of this aspect, the method further includes receiving a request from the network node to listen to Mode 2 signals from WDs surrounding the WD, and receiving indications of sidelink resources pools.

According to another aspect of the present disclosure, a method for a network node for selecting a communication interface of a WD is provided. The network node supports communication with the WD. The method includes determining a WD positioning information status and a cellular coverage status of the WD. A WD state is determined based on the determined WD positioning information status and the cellular coverage status. A network action is performed based on the determined WD state. In addition, the method includes selecting the WD communication interface based at least in part on the determined WD state.

In some embodiments of this aspect, the method further includes transmitting to the WD a configuration that specifies how the WD positioning information status, the cellular coverage status, and the WD state are determined. In some other embodiments of this aspect, the configuration further specifies transmitting a position information by the WD in accordance with a reporting mode selected from one of single-report request, periodic, event triggered, and event-triggered-periodic. In some embodiments of this aspect, the cellular coverage status is one of in coverage and out of coverage, and the WD positioning information status is one of up-to-date and obsolete.

In some embodiments of this aspect, the determined WD state is state 1 when the cellular coverage status is in coverage and the WD positioning information status is up-to-date. The determined WD state is state 2 when the cellular coverage status is in coverage and the WD positioning information status is obsolete. The determined WD state is state 3 when the cellular coverage status is out of coverage and the WD positioning information status is up-to-date. The determined WD state is state 4 when the cellular coverage status is out of coverage and the WD positioning information status is obsolete.

In some embodiments of this aspect, performing the network action further includes, when the WD state is state 1, requesting the WD to send a position report including a WD position. When the WD state is state 2, the WD position is marked as uncertain and a network support is provided. When the WD state is state 3, the WD position is marked as unknown. When the WD state is state 4, the WD position is marked as unknown.

In some embodiments of this aspect, selecting the WD communication interface further includes, when the WD state is state 1, selecting as the WD communication interface one of a Uu interface, a PC5 Mode 1 interface, and a PC5 Mode 2 interface. The selected WD communication interface is signalable to the WD to cause the WD to transmit at least the position report. In addition, selecting the WD communication interface includes, when the WD state is state 2, selecting as the WD communication interface one of a Uu interface, a PC5 Mode 1 interface, and a PC5 Mode 2 interface. The selected WD communication interface is signalable to the WD to cause the WD to transmit at least a position warning and a network support request.

In some embodiments of this aspect, providing the network support includes transmitting one of a DL PRS and RTK assistance data. In some other embodiments of this aspect, the WD position is determined based at least on information provided by a position-determining source including at least one of a DL PRS, a GNSS, and at least one WD sensor. In some embodiments of this aspect, the method includes receiving WD position information from the WD. In some other embodiments of this aspect, the received WD position information further includes the WD state and the position-determining source utilized to determine the WD position.

In some embodiments of this aspect, determining the WD state is further based on the received WD position information. In some other embodiments of this aspect, the method further includes allocating specific resource pools for Mode 2 position broadcast. In some embodiments of this aspect, determining the cellular coverage status is based at least in part on a predefined threshold.

According to another aspect of the present disclosure, a WD configured to select a communication interface is provided. The WD supports communication with a network node and includes at least one communication interface. The WD also includes processing circuitry in communication with the at least one communication interface. The processing circuitry has a processor and a memory. The processing circuitry is configured to determine a WD positioning information status and a cellular coverage status and determine a WD state based on the determined WD positioning information status and the cellular coverage status. The processing circuitry is further configured to cause transmission of position information based on the determined WD state and select the communication interface based at least in part on the determined WD state.

In some embodiments of this aspect, the processing circuitry is further configured to receive a configuration that specifies how the WD positioning information status, the cellular coverage status, and the WD state are determined. The processing circuitry is also configured to create a state information table based at least on the received configuration. In some other embodiments of this aspect, the configuration further specifies transmitting the position information in accordance with a reporting mode selected from one of single-report request, periodic, event triggered, and event-triggered-periodic. In some embodiments of this aspect, the received configuration is one of a configuration received from the network node, a configuration based at least on subscription data, and a configuration based at least on preconfigured data. In some other embodiments of this aspect, the cellular coverage status is one of in coverage and out of coverage, and the WD positioning information status is one of up-to-date and obsolete.

In some embodiments of this aspect, the determined WD state is state 1 when the cellular coverage status is in coverage and the WD positioning information status is up-to-date. The determined WD state is state 2 when the cellular coverage status is in coverage and the WD positioning information status is obsolete. The determined WD state is state 3 when the cellular coverage status is out of coverage and the WD positioning information status is up-to-date. The determined WD state is state 4 when the cellular coverage status is out of coverage and the WD positioning information status is obsolete.

In some embodiments of this aspect, causing transmission of the position information further includes, when the WD state is state 1, causing transmission of a position report including a WD position. When the WD state is state 2, a position warning and a network support request are caused to be transmitted. When the WD state is state 3, an estimated WD position using a Mode 2 broadcast is caused to be transmitted and positions of surrounding wireless devices are caused to be scanned for. In addition, when the WD state is state 4, a warning signal using a Mode 2 broadcast is caused to be transmitted. The warning signal indicates that the WD position is unknown.

In some embodiments of this aspect, selecting the communication interface further includes, when the WD state is state 1, selecting as the communication interface one of a Uu interface, a PC5 Mode 1 interface, and a PC5 Mode 2 interface. The communication interface selection is based at least in part on one of a received selection made by the network node and a selection made by the WD. The communication interface is selected to transmit at least the position report. When the WD state is state 2, one of a Uu interface, a PC5 Mode 1 interface, and a PC5 Mode 2 interface is selected as the communication interface. The communication interface selection is based at least in part on one of a received selection made by the network node and a selection made by the WD. The communication interface is selected to transmit at least the position warning and the network support request. When the WD state is state 3, a PC5 Mode 2 interface is selected as the communication interface. The communication interface selection is made by the WD. The communication interface is selected to transmit at least the estimated WD position using a Mode 2 broadcast and to scan for positions of surrounding wireless devices. When the WD state is state 4, a PC5 Mode 2 interface is selected as the communication interface. The communication interface selection being made by the WD. The communication interface is selected to transmit at least the warning signal indicating that the WD position is unknown using a Mode 2 broadcast.

In some embodiments of this aspect, the network support request includes a request to the network node to transmit one of a DL PRS and RTK assistance data. In some other embodiments of this aspect, the WD position is determined based at least on information provided by a position-determining source including at least one of a DL PRS, a GNSS, and at least one WD sensor. In some embodiments of this aspect, the transmitted position information further includes the WD state and the position-determining source utilized to determine the WD position.

In some embodiments of this aspect, determining the cellular coverage status is based at least in part on a predefined threshold. In some other embodiments of this aspect, the processing circuitry is further configured to receive a request from the network node to listen to Mode 2 signals from WDs surrounding the WD, and configured to receive indications of sidelink resources pools.

According to another aspect of the present disclosure, a network node configured to select a communication interface of a WD is provided. The network node supports communication with the WD. The network node includes a processing circuitry, which has a processor and a memory. The processing circuitry is configured to determine a WD positioning information status and a cellular coverage status of the WD and configured to determine a WD state based on the determined WD positioning information status and the cellular coverage status. The processing circuitry is further configured to perform a network action based on the determined WD state and to select the WD communication interface based at least in part on the determined WD state.

In some embodiments of this aspect, the processing circuitry is further configured to cause transmission to the WD of a configuration that specifies how the WD positioning information status, the cellular coverage status, and the WD state are determined. In some other embodiments of this aspect, the configuration further specifies transmitting a position information by the WD in accordance with a reporting mode selected from one of single-report request, periodic, event triggered, and event-triggered-periodic. In some embodiments of this aspect, the cellular coverage status is one of in coverage and out of coverage, and the WD positioning information status is one of up-to-date and obsolete.

In some embodiments of this aspect, the determined WD state is state 1 when the cellular coverage status is in coverage and the WD positioning information status is up-to-date. The determined WD state is state 2 when the cellular coverage status is in coverage and the WD positioning information status is obsolete. The determined WD state is state 3 when the cellular coverage status is out of coverage and the WD positioning information status is up-to-date. In addition, the determined WD state is state 4 when the cellular coverage status is out of coverage and the WD positioning information status is obsolete.

In some embodiments of this aspect, performing the network action further includes, when the WD state is state 1, causing transmission of a request the WD to send a position report including a WD position. When the WD state is state 2, the WD position is marked as uncertain and a network support is provided. When the WD state is state 3, the WD position is marked as unknown. When the WD state is state 4, the WD position is marked as unknown.

In some embodiments of this aspect, selecting the WD communication interface further includes, when the WD state is state 1, selecting as the WD communication interface one of a Uu interface, a PC5 Mode 1 interface, and a PC5 Mode 2 interface. The selected WD communication interface is signalable to the WD to cause the WD to transmit at least the position report. Selecting the WD communication interface also includes, when the WD state is state 2, selecting as the WD communication interface one of a Uu interface, a PC5 Mode 1 interface, and a PC5 Mode 2 interface. The selected WD communication interface is signalable to the WD to cause the WD to transmit at least a position warning and a network support request.

In some embodiments of this aspect, the network support includes transmitting one of a DL PRS and RTK assistance data. In some other embodiments of this aspect, the WD position is determined based at least on information provided by a position-determining source including at least one of a PRS, a GNSS, and at least one WD sensor. In some embodiments of this aspect. In some embodiments of this aspect, the processing circuitry is further configured to receive WD position. In some other embodiments of this aspect, the received WD position information further includes the WD state and the position-determining source utilized to determine the WD position.

In some embodiments of this aspect, determining the WD state is further based on the received WD position information. In some other embodiments of this aspect, the processing circuitry is further configured to allocate specific resource pools for Mode 2 position broadcast. In some embodiments of this aspect, determining the cellular coverage status is based at least in part on a predefined threshold.

BRIEF DESCRIPTION OF THE DRAWINGS

A more complete understanding of the present embodiments, and the attendant advantages and features thereof, will be more readily understood by reference to the following detailed description when considered in conjunction with the accompanying drawings wherein.

DETAILED DESCRIPTION

Figure 1:
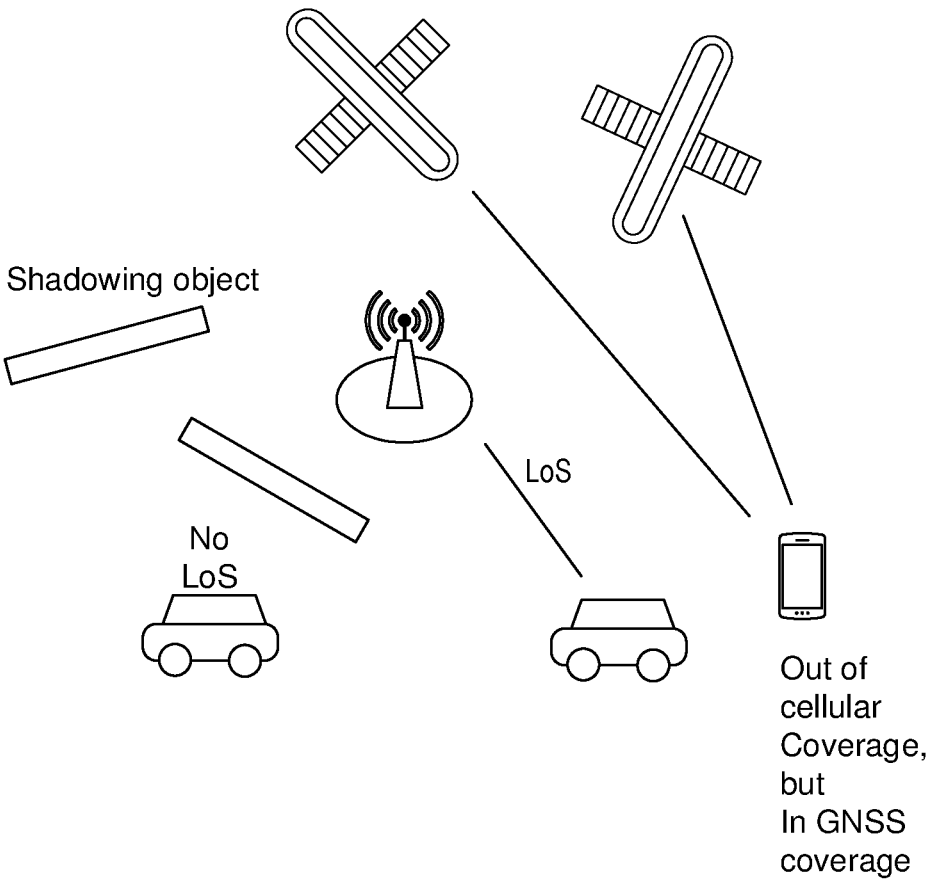
FIG. 1 is a schematic diagram of an example scenario illustrating problems with existing solutions.

Some embodiments of the present disclosure allow for providing position-based V2X services when a network (e.g., network node) is aware that some WDs lack up-to-date positioning information and the WDs can maintain relative positioning information with respect to each other.

In some embodiments, interface selection allows WDs to switch to D2D communications depending on the cellular/GNSS coverage and whether the available position information is up-to-date. There may be rules at the network node and the WDs that trigger sidelink communication as a fall back means to provide (gracefully degraded) V2X services when cellular assistance and positioning information are not available or not up to date.

In other embodiments, the network node and surrounding WDs take advantage of position information when available or take a graceful degradation of V2X services when WDs are out of coverage. As such, a gradual introduction of position-dependent services that are dependent of network assistance is provided. In some other embodiments, position-dependent services for some WDs can remain operational at some lower level (e.g., graceful service degradation) even when the WDs lack cellular coverage.

Before describing in detail exemplary embodiments, it is noted that the embodiments reside primarily in combinations of apparatus components and processing steps related to positioning-triggered interface selection. Accordingly, components have been represented where appropriate by conventional symbols in the drawings, showing only those specific details that are pertinent to understanding the embodiments so as not to obscure the disclosure with details that will be readily apparent to those of ordinary skill in the art having the benefit of the description herein. Like numbers refer to like elements throughout the description.

As used herein, relational terms, such as "first" and "second," "top" and "bottom," and the like, may be used solely to distinguish one entity or element from another entity or element without necessarily requiring or implying any physical or logical relationship or order between such entities or elements. The terminology used herein is for the purpose of describing particular embodiments only and is not intended to be limiting of the concepts described herein. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

In embodiments described herein, the joining term, "in communication with" and the like, may be used to indicate electrical or data communication, which may be accomplished by physical contact, induction, electromagnetic radiation, radio signaling, infrared signaling or optical signaling, for example. One having ordinary skill in the art will appreciate that multiple components may interoperate and modifications and variations are possible of achieving the electrical and data communication.

In some embodiments described herein, the term "coupled," "connected," and the like, may be used herein to indicate a connection, although not necessarily directly, and may include wired and/or wireless connections.

The term "network node" used herein can be any kind of network node comprised in a radio network which may further comprise any of base station (BS), radio base station, base transceiver station (BTS), base station controller (BSC), radio network controller (RNC), g Node B (gNB), evolved Node B (eNB or eNodeB), Node B, multi-standard radio (MSR) radio node such as MSR BS, multi-cell/multicast coordination entity (MCE), integrated access and backhaul (IAB) node, relay node, donor node controlling relay, radio access point (AP), transmission points, transmission nodes, Remote Radio Unit (RRU), Remote Radio Head (RRH), baseband unit (BBU), a core network node (e.g., mobile management entity (MME), self-organizing network (SON) node, a coordinating node, positioning node, MDT node, etc.), an external node (e.g., 3rd party node, a node external to the current network), nodes in distributed antenna system (DAS), a spectrum access system (SAS) node, an element management system (EMS), etc. The network node may also comprise test equipment. The term "radio node" used herein may be used to also denote a wireless device (WD) such as a wireless device (WD) or a radio network node.

In some embodiments, the non-limiting terms wireless device (WD) or a user equipment (UE) are used interchangeably. The WD herein can be any type of wireless device capable of communicating with a network node or another WD over radio signals, such as wireless device (WD). The WD may also be a radio communication device, target device, device to device (D2D) WD, machine type WD or WD capable of machine to machine communication (M2M), low-cost and/or low-complexity WD, a sensor equipped with WD, Tablet, mobile terminals, smart phone, laptop embedded equipped (LEE), laptop mounted equipment (LME), USB dongles, Customer Premises Equipment (CPE), an Internet of Things (IoT) device, or a Narrowband IoT (NB-IOT) device, etc.

In some embodiments, the term "WD" may be a vehicle with integrated wireless device functionality/hardware, a vehicle engaged in V2X communication/services, a wireless device inside a vehicle, the wireless device of a VRU, a wireless device supporting communication via D2D, a UE and the like.

Also, in some embodiments the generic term "radio network node" is used. It can be any kind of a radio network node which may comprise any of base station, radio base station, base transceiver station, base station controller, network controller, RNC, evolved Node B (eNB), Node B, gNB, Multi-cell/multicast Coordination Entity (MCE), IAB node, relay node, access point, radio access point, Remote Radio Unit (RRU) Remote Radio Head (RRH).

In some embodiments, the term "radio resource" is intended to indicate a frequency resource and/or a time resource. The time resource may correspond to any type of physical resource or radio resource expressed in terms of length of time. Examples of time resources are: symbol, time slot, subframe, radio frame, transmission time interval (TTI), interleaving time, etc. The frequency resource may correspond to one or more resource elements, subcarriers, resource blocks, bandwidth part and/or any other resources in the frequency domain. The radio resource may also indicate a combination of subcarriers, time slots, codes and/or spatial dimensions.

Even though the descriptions herein may be explained in the context of one of a Downlink (DL) and an Uplink (UL) communication, it should be understood that the basic principles disclosed may also be applicable to the other of the one of the DL and the UL communication. For DL communication, the network node is the transmitter and the receiver is the WD. For the UL communication, the transmitter is the WD and the receiver is the network node.

Although some the examples herein may be explained in the context of a WD being allocated radio resources on a physical channel for a periodic reference signal (e.g., SRS), it should be understood that the principles may also be applicable to other signals and other types of resources or other channels.

In some embodiments, the allocated radio resource may be allocated for a particular signal and on a particular channel. Signaling may generally comprise one or more symbols and/or signals and/or messages. A signal may comprise or represent one or more bits. An indication may represent signaling, and/or be implemented as a signal, or as a plurality of signals. One or more signals may be included in and/or represented by a message. Signaling, in particular control signaling, may comprise a plurality of signals and/or messages, which may be transmitted on different carriers and/or be associated to different signaling processes, e.g. representing and/or pertaining to one or more such processes and/or corresponding information. An indication may comprise signaling, and/or a plurality of signals and/or messages and/or may be comprised therein, which may be transmitted on different carriers and/or be associated to different acknowledgement signaling processes, e.g. representing and/or pertaining to one or more such processes. Signaling associated to a channel may be transmitted such that represents signaling and/or information for that channel, and/or that the signaling is interpreted by the transmitter and/or receiver to belong to that channel. Such signaling may generally comply with transmission parameters and/or format/s for the channel.

A channel may generally be a logical, transport or physical channel. A channel may comprise and/or be arranged on one or more carriers, in particular a plurality of subcarriers. A channel carrying and/or for carrying control signaling/control information may be considered a control channel, in particular if it is a physical layer channel and/or if it carries control plane information. Analogously, a channel carrying and/or for carrying data signaling/user information may be considered a data channel, in particular if it is a physical layer channel and/or if it carries user plane information. A channel may be defined for a specific communication direction, or for two complementary communication directions (e.g., UL and DL, or sidelink in two directions), in which case it may be considered to have at least two component channels, one for each direction. Examples of channels comprise a channel for low latency and/or high reliability transmission, in particular a channel for Ultra-Reliable Low Latency Communication (URLLC), which may be for control and/or data. In some embodiments, the channel described herein may be an uplink channel and in further embodiments may be a physical uplink shared channel (PUSCH) or a physical uplink control channel (PUCCH). In some embodiments, the channel may be a downlink channel, such as, a physical downlink control channel (PDCCH) or a physical downlink shared channel (PDSCH).

Transmitting in downlink may pertain to transmission from the network or network node to the terminal. The terminal may be considered the WD or UE. Transmitting in uplink may pertain to transmission from the terminal to the network or network node. Transmitting in sidelink may pertain to (direct) transmission from one terminal to another. Uplink, downlink and sidelink (e.g., sidelink transmission and reception) may be considered communication directions. In some variants, uplink and downlink may also be used to described wireless communication between network nodes, e.g. for wireless backhaul and/or relay communication and/or (wireless) network communication for example between base stations or similar network nodes, in particular communication terminating at such. It may be considered that backhaul and/or relay communication and/or network communication is implemented as a form of sidelink or uplink communication or similar thereto.

Note that although terminology from one particular wireless system, such as, for example, 3GPP LTE and/or New Radio (NR), may be used in this disclosure, this should not be seen as limiting the scope of the disclosure to only the aforementioned system. Other wireless systems, including without limitation Wide Band Code Division Multiple Access (WCDMA), Worldwide Interoperability for Microwave Access (WiMax), Ultra Mobile Broadband (UMB) and Global System for Mobile Communications (GSM), may also benefit from exploiting the ideas covered within this disclosure.

Note further, that functions described herein as being performed by a wireless device or a network node may be distributed over a plurality of wireless devices and/or network nodes. In other words, it is contemplated that the functions of the network node and wireless device described herein are not limited to performance by a single physical device and, in fact, can be distributed among several physical devices.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Some embodiments provide arrangements for positioning-triggered interface selection.

Figure 2:
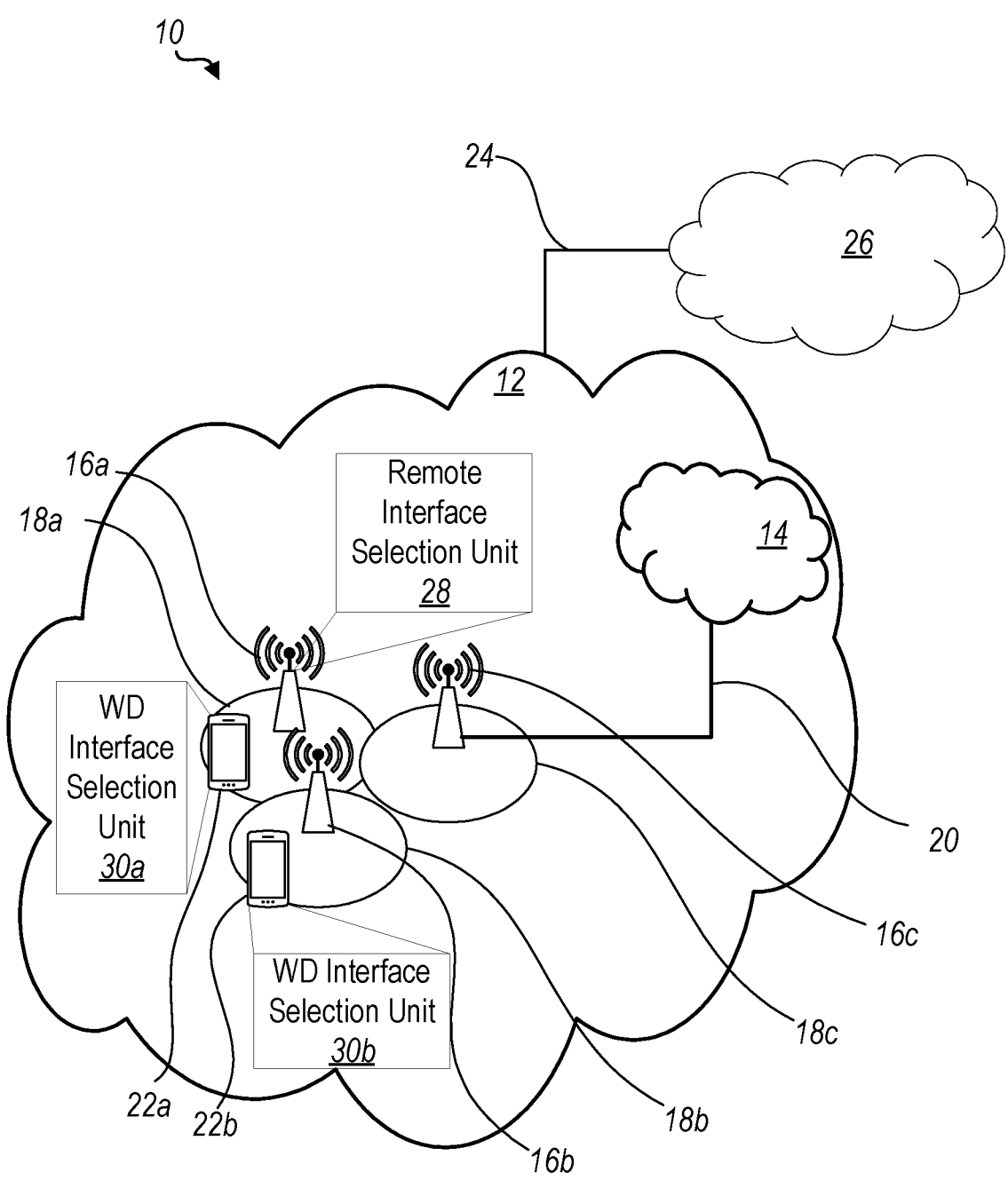
FIG. 2 is a schematic diagram of an example network architecture illustrating a communication system according to the principles in the present disclosure.

Referring again to the drawing figures, in which like elements are referred to by like reference numerals, there is shown in FIG. 2 a schematic diagram of a communication system 10, according to an embodiment, such as a 3GPP-type cellular network that may support standards such as LTE and/or NR (5G), which comprises an access network 12, such as a radio access network, and a core network 14. The access network 12 comprises a plurality of network nodes 16a, 16b, 16c (referred to collectively as network nodes 16), such as NBs, eNBs, gNBs or other types of wireless access points, each defining a corresponding coverage area 18a, 18b, 18c (referred to collectively as coverage areas 18). Each network node 16a, 16b, 16c is connectable to the core network 14 over a wired or wireless connection 20. A first wireless device (WD) 22a located in coverage area 18a is configured to wirelessly connect to, or be paged by, the corresponding network node 16a. A second WD 22b in coverage area 18b is wirelessly connectable to the corresponding network node 16b. While a plurality of WDs 22a, 22b (collectively referred to as wireless devices 22) are illustrated in this example, the disclosed embodiments are equally applicable to a situation where a sole WD is in the coverage area or where a sole WD is connecting to the corresponding network node 16. Note that although only two WDs 22 and three network nodes 16 are shown for convenience, the communication system may include many more WDs 22 and network nodes 16.

Also, it is contemplated that a WD 22 can be in simultaneous communication and/or configured to separately communicate with more than one network node 16 and more than one type of network node 16. For example, a WD 22 can have dual connectivity with a network node 16 that supports LTE and the same or a different network node 16 that supports NR. As an example, WD 22 can be in communication with an eNB for LTE/E-UTRAN and a gNB for NR/NG-RAN.

A network node 16 is configured to include a remote interface selection unit 28 which is configured to cause the network node 16 to determine a WD 22 positioning information status and a cellular coverage status of the WD 22, and to determine a WD 22 state based on the determined WD 22 positioning information status and the cellular coverage status. In addition, the remote interface selection unit 28 which is configured to cause the network node to perform a network action based on the determined WD 22 state, and to select a WD communication interface based at least in part on the determined WD state.

WD 22a is configured to include a WD interface selection unit 30a which is configured to cause the WD 22 to determine a WD positioning information status and a cellular coverage status, and to determine a WD state based on the determined WD positioning information status and the cellular coverage status. In addition, the WD interface selection unit 30a is configured to cause transmission position information based on the determined WD state and to select a communication interface based at least in part on the determined WD state.

Any WD 22, e.g., WD 22b, may include a WD interface selection unit 30 configured to perform similar functions as the functions of the WD interface selection unit 30a included in WD 22a.

Example implementations, in accordance with an embodiment, of the WD 22a, the WD 22b, and network node 16 discussed in the preceding paragraphs will now be described with reference to FIG. 3.

The communication system 10 further includes a network node 16 provided in a communication system 10 and including hardware 32 enabling it to communicate with the WD 22. The hardware 32 may include a communication interface 34 for setting up and maintaining a wired or wireless connection with an interface of a different communication device of the communication system 10, as well as a radio interface 36 for setting up and maintaining at least a wireless connection 38 with the WD 22a located in a coverage area 18 served by the network node 16 and/or a wireless connection 40 with the WD 22b located in a coverage area 18 served by the network node 16. The radio interface 36 may be formed as or may include, for example, one or more RF transmitters, one or more RF receivers, and/or one or more RF transceivers.

In the embodiment shown, the hardware 32 of the network node 16 further includes processing circuitry 42. The processing circuitry 42 may include a processor 44 and a memory 46. In particular, in addition to or instead of a processor, such as a central processing unit, and memory, the processing circuitry 42 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 44 may be configured to access (e.g., write to and/or read from) the memory 46, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the network node 16 further has software 48 stored internally in, for example, memory 46, or stored in external memory (e.g., database, storage array, network storage device, etc.) accessible by the network node 16 via an external connection. The software 48 may be executable by the processing circuitry 42. The processing circuitry 42 may be configured to control any of the methods and/or processes described herein and/or to cause such methods, and/or processes to be performed, e.g., by network node 16. Processor 44 corresponds to one or more processors 44 for performing network node 16 functions described herein. The memory 46 is configured to store data, programmatic software code and/or other information described herein. In some embodiments, the software 48 may include instructions that, when executed by the processor 44 and/or processing circuitry 42, causes the processor 44 and/or processing circuitry 42 to perform the processes described herein with respect to network node 16. For example, processing circuitry 42 of the network node 16 may include remote interface selection unit 28 configured to perform network node methods discussed herein, such as the methods discussed with reference to FIGS. 4 and 5 as well as other figures.

The communication system 10 further includes the WD 22a already referred to. The WD 22a may have hardware 50 that may include a radio interface 52 configured to set up and maintain a wireless connection 38 with a network node 16 serving a coverage area 18 in which the WD 22a is currently located. The radio interface 52 may be formed as or may include, for example, one or more RF transmitters, one or more RF receivers, and/or one or more RF transceivers. In some embodiments, the radio interface 52 may be a cellular interface (Uu) and may be configured to support Uu communication. The hardware 50 may also include a sidelink interface 54 configured to set up and maintain a wireless connection 56 with other WDs 22, such as WD 22b. In some embodiments, the sidelink interface 54 is further configured to support PC5 Mode 1 communication and PC5 Mode 2 communication. As such, the sidelink interface 54 may include a PC5 Mode 1 interface and/or a PC5 Mode 2 interface. The sidelink interface 54 may be formed as or may include, for example, one or more RF transmitters, one or more RF receivers, and/or one or more RF transceivers and may use the same RF components as the radio interface 52. The radio interface 52 and the sidelink interface 54 may, both or individually, form a communication interface of WD 22a. In other words, "communication interface" as used herein refers to one or the other or both of the radio interface 52 and the sidelink interface 54.

The hardware 50 of the WD 22a further includes processing circuitry 58. The processing circuitry 58 may include a processor 60 and memory 62. In particular, in addition to or instead of a processor, such as a central processing unit, and memory, the processing circuitry 58 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 60 may be configured to access (e.g., write to and/or read from) memory 62, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the WD 22a may further comprise software 64, which is stored in, for example, memory 62 at the WD 22a, or stored in external memory (e.g., database, storage array, network storage device, etc.) accessible by the WD 22a. The software 64 may be executable by the processing circuitry 58. The software 64 may include a client application 66. The client application 66 may be operable to provide a service to a human or non-human user via the WD 22a. The client application 66 may interact with the user to generate the user data that it provides.

The processing circuitry 58 may be configured to control any of the methods and/or processes described herein and/or to cause such methods, and/or processes to be performed, e.g., by WD 22a. The processor 60 corresponds to one or more processors 60 for performing WD 22a functions described herein. The WD 22a includes memory 62 that is configured to store data, programmatic software code and/or other information described herein. In some embodiments, the software 64 and/or the client application 66 may include instructions that, when executed by the processor 60 and/or processing circuitry 58, causes the processor 60 and/or processing circuitry 58 to perform the processes described herein with respect to WD 22a. For example, the processing circuitry 58 of the WD 22a may be configured to use resources and/or receive and/or transmit on radio resources (e.g., physical layer resources, such as, physical downlink control channel, physical downlink shared channel, physical uplink control channel and/or physical uplink shared channel, etc.) that are allocated to the WD 22a using one or more of the techniques disclosed herein.

The communication system 10 further includes the WD 22b already referred to. The WD 22b includes the WD interface selection unit 30b (WD interface selections units are referred to collectively herein as WD interface selection unit 30). It is understood that WD 22b may include any of the elements included in WD 22a and that each included element may function similarly to the corresponding element in WD 22a.

Figure 3:
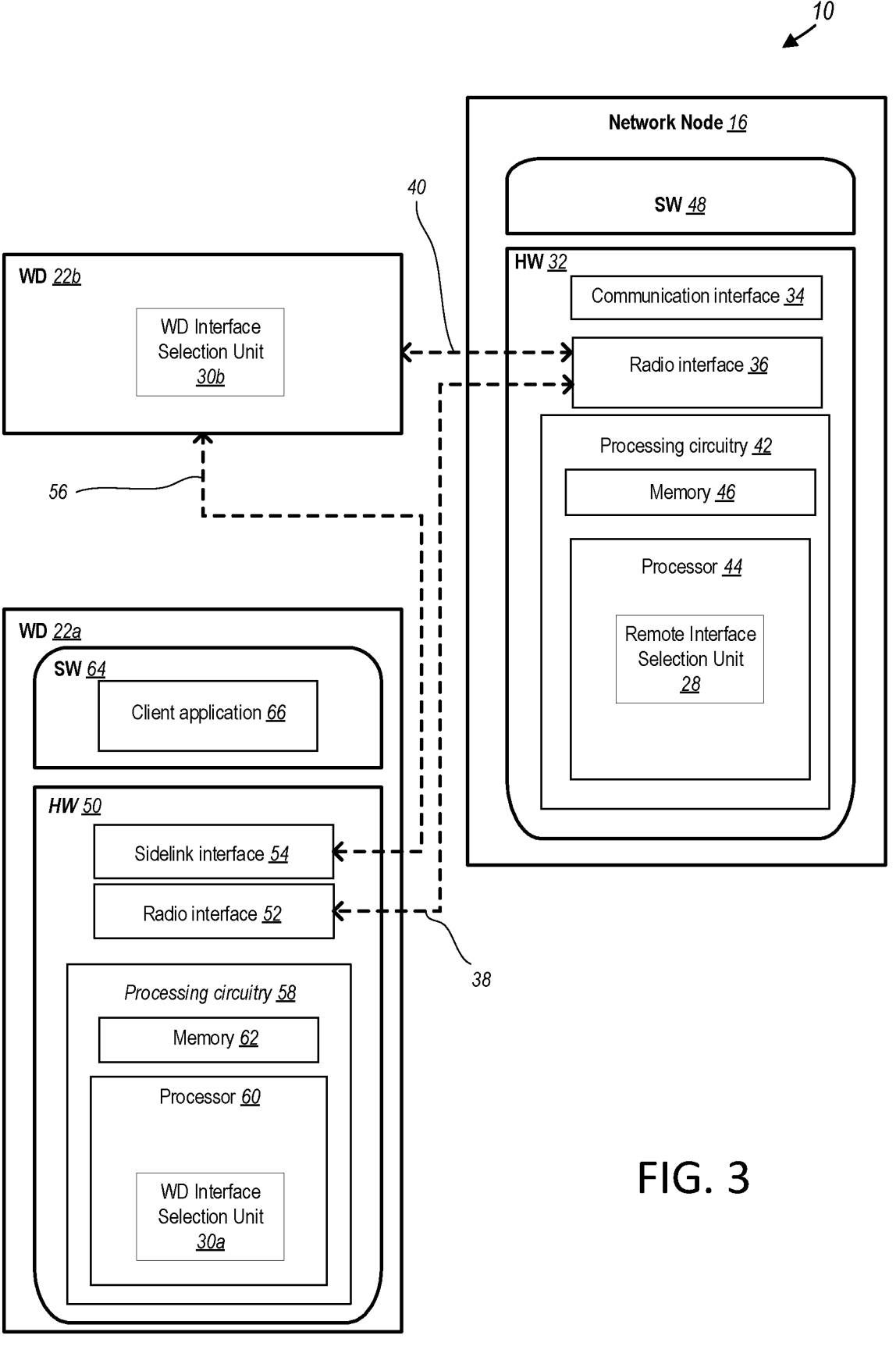
FIG. 3 is a block diagram of a network node supporting communication with wireless devices over an at least partially wireless connection and wireless devices supporting communication with the network node and D2D communication according to some embodiments of the present disclosure.

In some embodiments, the inner workings of the network node 16, WD 22a and WD 22b, may be as shown in FIG. 3 and independently, the surrounding network topology may be that of FIG. 2.

Although FIGS. 2 and 3 show various "units" such as remote interface selection unit 28 and WD interface selection unit 30a as being within a processor, and WD interface selection unit 30b as being within WD 22b (or within a processor (not shown) in WD 22b), it is contemplated that these units may be implemented such that a portion of the unit is stored in a corresponding memory within the processing circuitry. In other words, the units may be implemented in hardware or in a combination of hardware and software within the processing circuitry.

Figure 4:
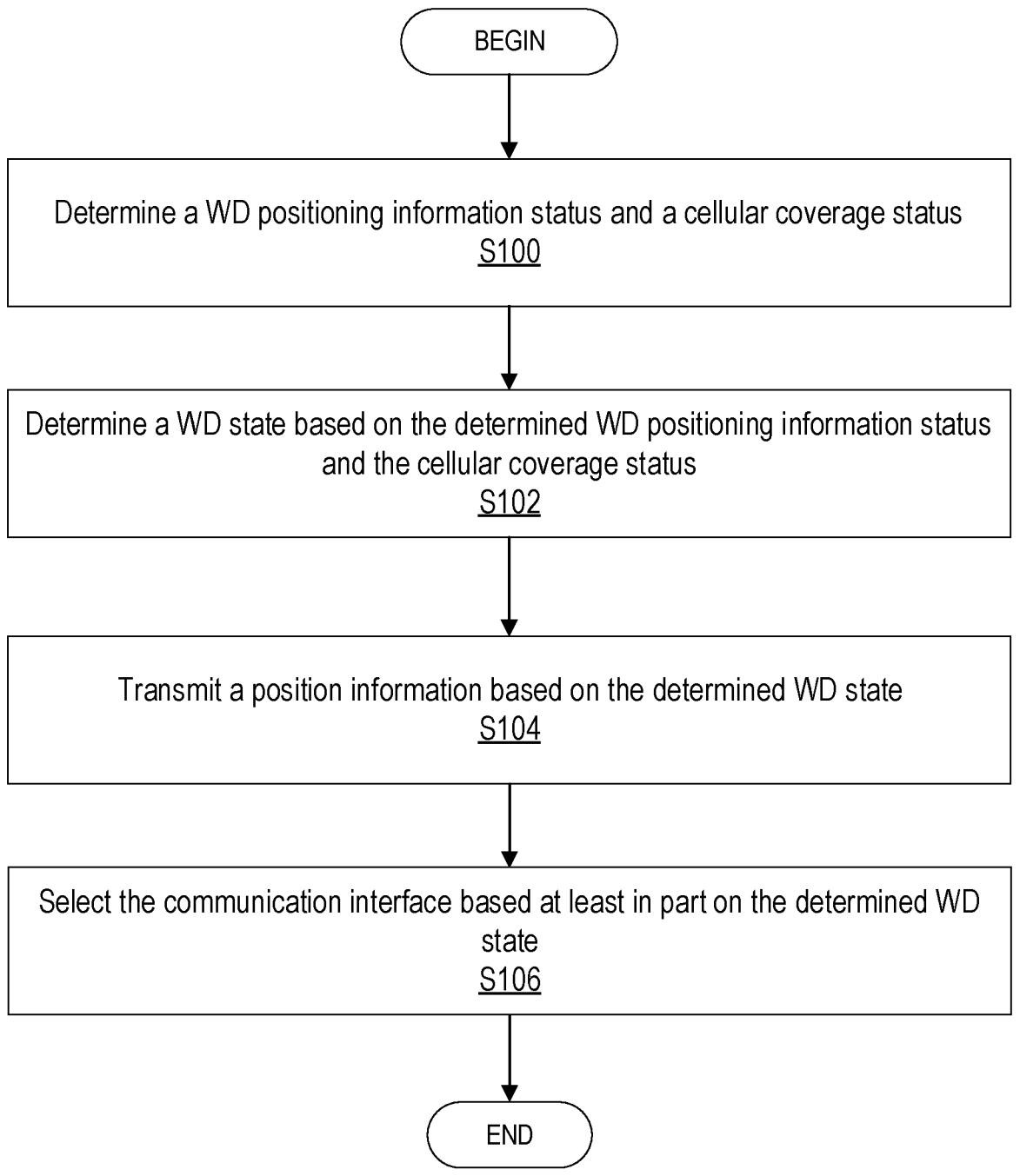
FIG. 4 is a flowchart of an example method for a wireless device for selecting a communication interface according to one embodiment of the present disclosure.

FIG. 4 is a flowchart of an exemplary process in a WD 22 for selecting a communication interface according to some embodiments of the present disclosure. Selecting a communication interface may include selecting the radio interface 52 and/or the sidelink interface 54 of the WD 22. One or more Blocks and/or functions and/or methods performed by the WD 22 may be performed by one or more elements of WD 22, such as WD interface selection unit 30a in processing circuitry 58, processor 60, sidelink interface 54, radio interface 52, etc. according to the example method. The example method includes determining (Block S100), such as via WD interface selection unit 30a, processing circuitry 58, processor 60, sidelink interface 54 and/or radio interface 52, a WD positioning information status and a cellular coverage status. The method further includes determining (Block S102), such as via WD interface selection unit 30a, processing circuitry 58, processor 60, sidelink interface 54 and/or radio interface 52, a WD state based on the determined WD positioning information status and the cellular coverage status. In addition, the method includes transmitting (Block S104), such as via WD interface selection unit 30a, processing circuitry 58, processor 60, sidelink interface 54 and/or radio interface 52, a position information based on the determined WD state and selecting (Block S106), such as via WD interface selection unit 30a, processing circuitry 58, processor 60, sidelink interface 54 and/or radio interface 52, the communication interface 52, 54 based at least in part on the determined WD state.

In some embodiments of this aspect, a configuration is received, such as via WD interface selection unit 30a, processing circuitry 58, processor 60, sidelink interface 54 and/or radio interface 52, and the configuration specifies how the WD positioning information status, the cellular coverage status, and the WD state are determined. In addition, a state information table is created, such as via WD interface selection unit 30a, processing circuitry 58, processor 60, sidelink interface 54 and/or radio interface 52, based at least on the received configuration. In other embodiments, the configuration further specifies transmitting, such as via WD interface selection unit 30a, processing circuitry 58, processor 60, sidelink interface 54 and/or radio interface 52, the position information in accordance with a reporting mode selected from one of single-report request, periodic, event triggered, and event-triggered-periodic. In yet another embodiment of this aspect, the received configuration is one of a configuration received, such as via WD interface selection unit 30a, processing circuitry 58, processor 60, sidelink interface 54 and/or radio interface 52, from the network node, a configuration based at least on subscription data, and a configuration based at least on preconfigured data.

In some embodiments of this aspect, the cellular coverage status is one of in coverage and out of coverage, and the WD positioning information status is one of up-to-date and obsolete. In another embodiment of this aspect, the determined WD state, such as via WD interface selection unit 30a, processing circuitry 58, processor 60, sidelink interface 54 and/or radio interface 52, is state 1 when the cellular coverage status is in coverage and the WD positioning information status is up-to-date. The determined WD state, such as via WD interface selection unit 30a, processing circuitry 58, processor 60, sidelink interface 54 and/or radio interface 52, is state 2 when the cellular coverage status is in coverage and the WD positioning information status is obsolete. The determined WD state, such as via WD interface selection unit 30a, processing circuitry 58, processor 60, sidelink interface 54 and/or radio interface 52, is state 3 when the cellular coverage status is out of coverage and the WD positioning information status is up-to-date. The determined WD state, such as via WD interface selection unit 30a, processing circuitry 58, processor 60, sidelink interface 54 and/or radio interface 52, is state 4 when the cellular coverage status is out of coverage and the WD positioning information status is obsolete.

In one embodiment of this aspect, transmitting the position information further includes when the WD state is state 1, transmitting, such as via WD interface selection unit 30a, processing circuitry 58, processor 60, sidelink interface 54 and/or radio interface 52, a position report including a WD position. When the WD state is state 2, a position warning and a network support request is transmitted, such as via WD interface selection unit 30a, processing circuitry 58, processor 60, sidelink interface 54 and/or radio interface 52. When the WD state is state 3, an estimated WD position using a Mode 2 broadcast is transmitted, such as via WD interface selection unit 30a, processing circuitry 58, processor 60, sidelink interface 54 and/or radio interface 52, and positions of surrounding wireless devices are scanning for, such as via WD interface selection unit 30a, processing circuitry 58, processor 60, sidelink interface 54 and/or radio interface 52. When the WD state is state 4, a warning signal using a Mode 2 broadcast is transmitted, such as via WD interface selection unit 30a, processing circuitry 58, processor 60, sidelink interface 54 and/or radio interface 52. The warning signal indicates that the WD position is unknown.

In some embodiments of this aspect, selecting the communication interface 52, 54 further includes, when the WD state is state 1, selecting as the communication interface 52, 54, such as via WD interface selection unit 30a, processing circuitry 58, processor 60, sidelink interface 54 and/or radio interface 52, one of a cellular interface (Uu), a Direct Communication (PC5) Mode 1 interface, and a PC5 Mode 2 interface. The communication interface selection is based at least in part on one of a received selection made by the network node and a selection made by the WD. The communication interface 52, 54 is selected to transmit, such as via WD interface selection unit 30a, processing circuitry 58, processor 60, sidelink interface 54 and/or radio interface 52, at least the position report.

When the WD state is state 2, one of a Uu interface, a PC5 Mode 1 interface, and a PC5 Mode 2 interface is selected as the communication interface 52, 54, such as via WD interface selection unit 30a, processing circuitry 58, processor 60, sidelink interface 54 and/or radio interface 52. The communication interface selection is based at least in part on one of a received selection made by the network node and a selection made by the WD 22a, such as via WD interface selection unit 30a, processing circuitry 58, processor 60, sidelink interface 54 and/or radio interface 52. The communication interface 52, 54 is selected to transmit, such as via WD interface selection unit 30a, processing circuitry 58, processor 60, sidelink interface 54 and/or radio interface 52, at least the position warning and the network support request.

When the WD state is state 3, a PC5 Mode 2 interface is selected as the communication interface 54, such as via WD interface selection unit 30a, processing circuitry 58, processor 60, sidelink interface 54 and/or radio interface 52. The communication interface selection is made by the WD 22a, such as via WD interface selection unit 30a, processing circuitry 58, processor 60, sidelink interface 54 and/or radio interface 52. The communication interface 54 is selected to transmit, such as via WD interface selection unit 30a, processing circuitry 58, processor 60, sidelink interface 54 and/or radio interface 52, at least the estimated WD position using a Mode 2 broadcast and to scan, such as via WD interface selection unit 30a, processing circuitry 58, processor 60, sidelink interface 54 and/or radio interface 52, for positions of surrounding wireless devices.

When the WD state is state 4, a PC5 Mode 2 interface is selected, such as via WD interface selection unit 30a, processing circuitry 58, processor 60, sidelink interface 54 and/or radio interface 52, as the communication interface 54. The communication interface selection is made by the WD 22a, such as via WD interface selection unit 30a, processing circuitry 58, processor 60, sidelink interface 54 and/or radio interface 52. The communication interface 54 is selected to transmit, such as via WD interface selection unit 30a, processing circuitry 58, processor 60, sidelink interface 54 and/or radio interface 52, at least the warning signal indicating that the WD position is unknown using a Mode 2 broadcast.

In some embodiments of this aspect, the network support request includes a request, such as via WD interface selection unit 30a, processing circuitry 58, processor 60, sidelink interface 54 and/or radio interface 52, to the network node to transmit one of a Down Link Positioning Reference Signal (DL PRS) and Real-Time Kinematic (RTK) assistance data. In some other embodiments of this aspect, the WD position is determined, such as via WD interface selection unit 30a, processing circuitry 58, processor 60, sidelink interface 54 and/or radio interface 52, based at least on information provided by a position-determining source including at least one of a DL PRS, a Global Navigation Satellite System (GNSS), and at least one WD sensor. In some other embodiments of this aspect, the transmitted position information further includes the WD state and the position-determining source utilized to determine, such as via WD interface selection unit 30a, processing circuitry 58, processor 60, sidelink interface 54 and/or radio interface 52, the WD position.

In some embodiments of this aspect, determining, such as via WD interface selection unit 30a, processing circuitry 58, processor 60, sidelink interface 54 and/or radio interface 52, the cellular coverage status is based at least in part on a predefined threshold. In some embodiments of this aspect, the method further includes receiving, such as via WD interface selection unit 30a, processing circuitry 58, processor 60, sidelink interface 54 and/or radio interface 52, a request from the network node to listen to Mode 2 signals from WDs surrounding the WD, and receiving, such as via WD interface selection unit 30a, processing circuitry 58, processor 60, sidelink interface 54 and/or radio interface 52, indications of sidelink resources pools.

Figure 5:
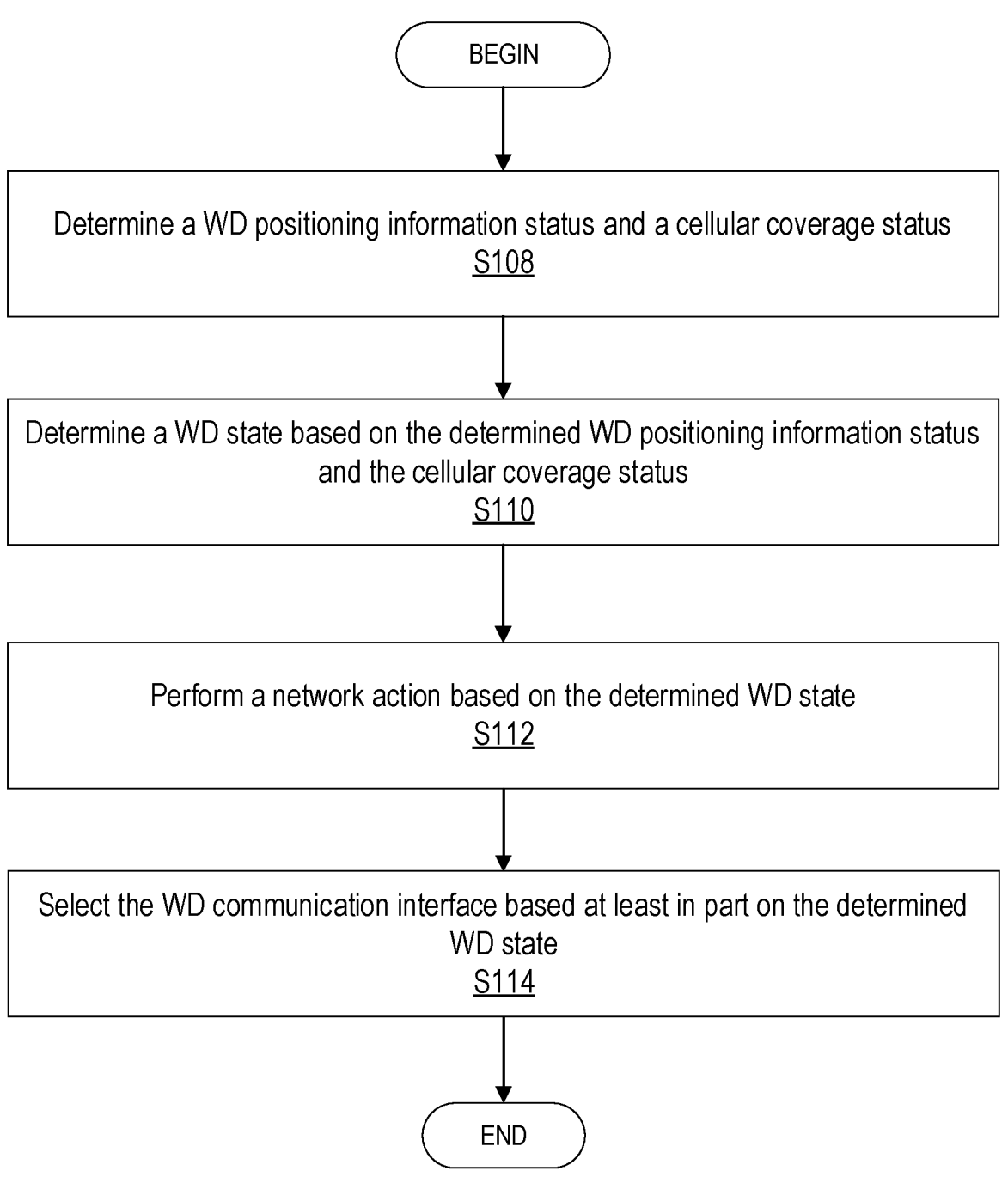
FIG. 5 is a flowchart of an example method for a network node for selecting a communication interface of a wireless device according to one embodiment of the present disclosure.

FIG. 5 is a flowchart of an exemplary process in a network node 16 for selecting a communication interface of a WD 22. Selecting a communication interface may include selecting the radio interface 52 and/or the sidelink interface 54 of WD 22 or components with similar functions in other WDs. One or more Blocks and/or functions and/or methods performed by network node 16 may be performed by one or more elements of network node 16 such as by remote interface selection unit 28 in processing circuitry 42, processor 44, communication interface 34, radio interface 36, etc. The example method includes determining (Block S108), such as via remote interface selection unit 28, processing circuitry 42, processor 44, communication interface 34 and/or radio interface 36, a WD positioning information status and a cellular coverage status of the WD. The method further includes determining (Block S110), such as via remote interface selection unit 28, processing circuitry 42, processor 44, communication interface 34 and/or radio interface 36, a WD state based on the determined WD positioning information status and the cellular coverage status. In addition, the method includes performing (Block S112), such as via remote interface selection unit 28, processing circuitry 42, processor 44, communication interface 34 and/or radio interface 36, a network action based on the determined WD state and selecting (Block S114), such as via remote interface selection unit 28, processing circuitry 42, processor 44, communication interface 34 and/or radio interface 36, the WD communication interface 52, 54 based at least in part on the determined WD state.

In some embodiments of this aspect, the method further includes transmitting, such as via remote interface selection unit 28, processing circuitry 42, processor 44, communication interface 34 and/or radio interface 36, to the WD a configuration that specifies how the WD positioning information status, the cellular coverage status, and the WD state are determined. In some other embodiments of this aspect, the configuration further specifies transmitting, such as via remote interface selection unit 28, processing circuitry 42, processor 44, communication interface 34 and/or radio interface 36, a position information by the WD in accordance with a reporting mode selected, such as via remote interface selection unit 28, processing circuitry 42, processor 44, communication interface 34 and/or radio interface 36, from one of single-report request, periodic, event triggered, and event-triggered-periodic. In some embodiments of this aspect, the cellular coverage status is one of in coverage and out of coverage, and the WD positioning information status is one of up-to-date and obsolete.

In some embodiments of this aspect, the determined WD state, such as via remote interface selection unit 28, processing circuitry 42, processor 44, communication interface 34 and/or radio interface 36, is state 1 when the cellular coverage status is in coverage and the WD positioning information status is up-to-date. The determined WD state, such as via remote interface selection unit 28, processing circuitry 42, processor 44, communication interface 34 and/or radio interface 36, is state 2 when the cellular coverage status is in coverage and the WD positioning information status is obsolete. The determined WD state, such as via remote interface selection unit 28, processing circuitry 42, processor 44, communication interface 34 and/or radio interface 36, is state 3 when the cellular coverage status is out of coverage and the WD positioning information status is up-to-date. The determined WD state, such as via remote interface selection unit 28, processing circuitry 42, processor 44, communication interface 34 and/or radio interface 36, is state 4 when the cellular coverage status is out of coverage and the WD positioning information status is obsolete.

In some embodiments of this aspect, performing the network action further includes, when the WD state is state 1, requesting, such as via remote interface selection unit 28, processing circuitry 42, processor 44, communication interface 34 and/or radio interface 36, the WD to send a position report including a WD position. When the WD state is state 2, the WD position is marked, such as via remote interface selection unit 28, processing circuitry 42, processor 44, communication interface 34 and/or radio interface 36, as uncertain and a network support is provided, such as via remote interface selection unit 28, processing circuitry 42, processor 44, communication interface 34 and/or radio interface 36. When the WD state is state 3, the WD position is marked, such as via remote interface selection unit 28, processing circuitry 42, processor 44, communication interface 34 and/or radio interface 36, as unknown. When the WD state is state 4, the WD position is marked as unknown, such as via remote interface selection unit 28, processing circuitry 42, processor 44, communication interface 34 and/or radio interface 36.

In some embodiments of this aspect, selecting the WD communication interface 52, 54 further includes, when the WD state is state 1, selecting, such as via remote interface selection unit 28, processing circuitry 42, processor 44, communication interface 34 and/or radio interface 36, as the WD communication interface one of a Uu interface, a PC5 Mode 1 interface, and a PC5 Mode 2 interface. The selected WD communication interface 52, 54 is signalable, such as via remote interface selection unit 28, processing circuitry 42, processor 44, communication interface 34 and/or radio interface 36, to the WD to cause the WD to transmit at least the position report. In addition, selecting the WD communication interface 52, 54 includes, when the WD state is state 2, selecting, such as via remote interface selection unit 28, processing circuitry 42, processor 44, communication interface 34 and/or radio interface 36, as the WD communication interface 52, 54 one of a Uu interface, a PC5 Mode 1 interface, and a PC5 Mode 2 interface. The selected WD communication interface 52, 54 is signalable, such as via remote interface selection unit 28, processing circuitry 42, processor 44, communication interface 34 and/or radio interface 36, to the WD 22a to cause the WD 22a to transmit at least a position warning and a network support request.

In some embodiments of this aspect, providing the network support includes transmitting, such as via remote interface selection unit 28, processing circuitry 42, processor 44, communication interface 34 and/or radio interface 36, one of a DL PRS and RTK assistance data. In some other embodiments of this aspect, the WD position is determined, such as via remote interface selection unit 28, processing circuitry 42, processor 44, communication interface 34 and/or radio interface 36, based at least on information provided by a position-determining source including at least one of a DL PRS, a GNSS, and at least one WD sensor. In some embodiments of this aspect, the method includes receiving, such as via remote interface selection unit 28, processing circuitry 42, processor 44, communication interface 34 and/or radio interface 36, WD position information from the WD. In some other embodiments of this aspect, the received WD position information further includes the WD state and the position-determining source utilized to determine the WD position.

In some embodiments of this aspect, determining the WD state is further based on the received, such as via remote interface selection unit 28, processing circuitry 42, processor 44, communication interface 34 and/or radio interface 36, WD position information. In some other embodiments of this aspect, the method further includes allocating, such as via remote interface selection unit 28, processing circuitry 42, processor 44, communication interface 34 and/or radio interface 36, specific resource pools for Mode 2 position broadcast. In some embodiments of this aspect, determining the cellular coverage status is based at least in part on a predefined threshold.

Having described the general process flow of arrangements of the disclosure and having provided examples of hardware and software arrangements for implementing the processes and functions of the disclosure, the sections below provide details and examples of arrangements for positioning-triggered interface selection, which may be implemented by the network node 16 and/or one or more wireless devices 22. Some embodiments provide one or more techniques for using for positioning-triggered interface selection in order to select a communication interface of one or more WDs 22. For ease of understanding, explanation is made with reference to WD 22a and its components. However, it is understood that the discussion herein with reference to WD 22a applies to all WDs 22.

Maintaining Status Information at the WD and Signaling Status Information to Network Node—Status and State Information at the WD.

In some embodiments, a WD 22, e.g., WD 22a, creates and maintains a status information table (Table 1).

TABLE 1

| WD State | Cellular Coverage Status | Local Positioning Information |
|---|---|---|
| 1 | In coverage | Up-to-date |
| 2 | In coverage | Obsolete |
| 3 | Out of coverage | Up-to-date |
| 4 | Out of coverage | Obsolete |

The WD 22a may create and/or maintain, such as via WD interface selection unit 30a, processing circuitry 58, processor 60, sidelink interface 54 and/or radio interface 52, the status information table based at least on subscription data, pre-configuration data, or information received from the network node. In addition, the WD 22a may determine, such as via WD interface selection unit 30a, processing circuitry 58, processor 60, sidelink interface 54 and/or radio interface 52, that cellular coverage status of the WD is in coverage by detecting that a reference signal received power (RSRP) and/or a received signal strength indication (RSSI) is at or above a preconfigured threshold level and/or by decoding broadcast Bose, Chaudhuri and Hoquenghem (BCH) information. In addition, the WD 22a may determine, such as via WD interface selection unit 30a, processing circuitry 58, processor 60, sidelink interface 54 and/or radio interface 52, that cellular coverage status of the WD is out of coverage by detecting that a RSRP and/or a RSSI is below a preconfigured threshold level and/or by decoding broadcast BCH information.

The WD 22a may determine, such as via WD interface selection unit 30a, processing circuitry 58, processor 60, sidelink interface 54 and/or radio interface 52, local positioning information, e.g., up-to-date/accurate or obsolete/inaccurate, based on GNSS signals, cellular positioning reference signals (PRS) and/or WD sensors, which may have been fused or updated with recent GNSS or PRS signals.

Alternatively, or in addition, the WD 22a may determine local positioning information from surrounding WDs, e.g., WDs that use cooperative positioning techniques.

It is understood that binary information associated with each WD state, such as in/out of coverage and up-to-date/ obsolete, may be extended to also include other forms of estimated accuracy (e.g. meter, sub-meter, decimeter, centimeter). Therefore, a WD 22 may have more states than the states included in Table 1.

According to Table 1, a WD 22a may have one of many states (e.g., State 1, 2, 3 and 4). The WD state is state 1 when the WD 22a determines, such as via WD interface selection unit 30a, processing circuitry 58, processor 60, sidelink interface 54 and/or radio interface 52, cellular coverage status is "in coverage" and local positioning information is up-to-date/accurate.

The WD state is state 2 when the WD 22a determines, such as via WD interface selection unit 30a, processing circuitry 58, processor 60, sidelink interface 54 and/or radio interface 52, that the WD 22a is in cellular coverage, but the WD's local positioning information is obsolete or inaccurate. For example, the WD's locally available positioning information may be inaccurate or obsolete in situations in which the WD 22a is out of GNSS coverage, cannot decode PRS, or cannot estimate/fuse cellular and WD local sensory information. These situations may arise when the WD 22a does not have LoS measurements from surrounding network nodes, or the WD 22a determines that the WD locally available positioning information is not sufficient with respect to some preconfigured accuracy target/threshold.

The WD state is state 3 when the WD 22a determines, such as via WD interface selection unit 30a, processing circuitry 58, processor 60, sidelink interface 54 and/or radio interface 52, that the WD 22a is out of cellular coverage, but the WD 22a has accurate positioning information, such as positioning information obtained from available GNSS signals, WD local sensory information, or from surrounding WDs. The WD state is state 4 when the WD 22a determines, such as via WD interface selection unit 30a, processing circuitry 58, processor 60, sidelink interface 54 and/or radio interface 52, that the WD 22a is out of cellular coverage and the WD 22a does not have accurate positioning information, or the positioning information is obsolete.

Additionally, the WD 22a may be configured to provide WD state, cellular coverage status, and/or local positioning information updates to the network node or to other WDs surrounding the WD. For example, the updates may be provided to the network node 16 when the WD cellular coverage is in coverage, or to other WDs surrounding the WD 22a when the local positioning information of the WD 22a is out of coverage. Further, the updates provided by the WD 22a may be any one of upon request, periodic, event-triggered, and event-triggered periodic updates. The WD configuration may be obtained from subscription data, pre-configuration data, or information received from the network node 16.

Similarly, Table 1 may also be created by and maintained on the network node 16 for each WD 22.

Maintaining Status Information at the WD and Signaling Status Information to Network Node—Network and WD Actions Based on the WD State.

TABLE 2

| WD State | Network Action | WD Action | Interface and Communication Mode Selection | Preferred Interface |
|---|---|---|---|---|
| 1 | Request position report. | Obtain DL measurements and/or transmit position report. | Interface selection by the network node; WD may recommend/request preferred interface; WD interfaces: Uu (cellular), PC5 Mode 1 and Mode 2. | Uu for transmitting position report to a network node. The network node may instruct the WD to broadcast position via Mode 1 PC5 interface. |
| 2 | Mark WD position as "uncertain" and/or initiate positioning event. | Transmit "position unknown" warning signal and/or request DL reference signal. | Interface selection by the network node; WD may indicate that WD will broadcast a "position unknown" warning signal on PC5; WD interfaces: Uu (cellular), PC5 Mode 1 and Mode 2. | Uu for requesting DL reference signal and PC5 Mode 1 for broadcasting "position unknown" warning signal to surrounding WDs. |
| 3 | Mark WD position as "unknown." | Mode 2 broadcast WD position and/or scan for positions of surrounding WDs | WD interfaces: PC5 Mode 2. | |

TABLE 2-continued

| WD State | Network Action | WD Action | Interface and Communication Mode Selection | Preferred Interface |
|---|---|---|---|---|
| 4 | Mark WD position as "unknown." | Mode 2 broadcast WD position as "unknown." | WD interfaces: PC5 Mode 2. | |

Note:
The WD States in Table 2 correspond to the WD States in Table 1.

In some embodiments, the WD 22a and the network node 16 execute actions, as detailed in Table 2. The WD 22a may be configured to execute each action once, upon entering a state, or periodically while the WD 22a is in a WD state.

When the WD state is state 1, the network node 16 may collect or request, such as via remote interface selection unit 28 in processing circuitry 42, processor 44, communication interface 34, radio interface 36, position information reports from the WD 22a. The collected position information may be maintained at the network node 16 continuously or when the network node 16 starts executing V2X cooperative services/orchestration, for which information per WD 22 is requested. For WD detection, e.g., VRU detection, the network node 16 may compare positioning information with other WDs to detect dangerous or vulnerable situations. In such situations, a first WD, e.g., a vehicle, a second WD, e.g., a VRU, continuously report, such as via WD interface selection unit 30 in processing circuitry 58, processor 60, sidelink interface 54, radio interface 52, updated absolute position to the network node. The position of the WDs may be obtained based on processing of DL PRS with assistance data, GNSS, or using additional WD sensors and WD data, or any combination of thereof. The WD 22a may also send, such as via WD interface selection unit 30a in processing circuitry 58, processor 60, sidelink interface 54, radio interface 52, position reports independent from a request for position report from the network node 16.

In addition, when the WD state is state 1, the network node 16 selects a WD communication interface for WD 22a, such as via remote interface selection unit 28 in processing circuitry 42, processor 44, communication interface 34, radio interface 36. WD interfaces that may be selected include Uu, PC5 Mode 1, and PC5 Mode 2. The WD 22a may recommend or request a preferred interface, which includes the WD Uu interface, e.g., for transmitting position reports to the network node 16. Further, the network node 16 may signal the selected WD communication interface to the WD 22a to cause, such as via remote interface selection unit 28 in processing circuitry 42, processor 44, communication interface 34, radio interface 36, the WD 22a to transmit position and/or position information, such as via a PC5 Mode 1 interface.

When the WD state is state 2, the actions from the WD 22a and the network node 16 may be DL-centric. WD positioning may also be based on UL signals, such as UL-SRS. In state 2, the WD 22a (having cellular coverage status in coverage) notifies the network node 16 of uncertainty about a WD position estimate, e.g., by transmitting a position unknown warning signal. The WD 22a may be configured to report the source of the WD position estimate (e.g. GNSS or PRS-based) or the time when the WD position was most recently determined. The WD 22a can also request network support, e.g., DL PRS signal from the network node 16 or RTK assistance data. The WD may also be associated with an estimated accuracy estimate (e.g. meter, sub-meter, decimeter). The network node 16 marks, such as via remote interface selection unit 28 in processing circuitry 42, processor 44, communication interface 34, radio interface 36, the WD position as uncertain and may initiate a positioning event, such as a transmitting a reference signal. Positioning events may include UL and/or DL signals.

Additionally, when the WD state is state 2, the network node 16 selects a WD communication interface for WD 22a. WD interfaces that may be selected include Uu, PC5 Mode 1, and PC5 Mode 2. The WD 22a may indicate that the WD 22a will broadcast a "position unknown" warning signal via PC5 interface. Preferred WD interfaces include Uu for requesting DL reference signal and PC5 Mode 1 for broadcasting "position unknown" warning to surrounding WDs. Further, the network node 16 initiate a positioning event. In one embodiment, the positioning event is that the network node 16 may signal the selected WD communication interface to the WD 22a to cause, such as via remote interface selection unit 28 in processing circuitry 42, processor 44, communication interface 34, radio interface 36, the WD 22a to transmit at least a position warning and/or a network support request.

When the WD state is state 3, the WD 22a has no cellular coverage from the network node 16, and the network node 16 marks, such as via remote interface selection unit 28 in processing circuitry 42, processor 44, communication interface 34, radio interface 36, the WD position as unknown. The WD 22a determines, such as via WD interface selection unit 30a in processing circuitry 58, processor 60, sidelink interface 54, radio interface 52, that the cellular coverage status is out of coverage. The WD 22a selects a PC5 Mode 2 interface as the communication interface 54 and transmits at least an estimated position of the WD 22a using Mode 2/D2D broadcast via the selected PC5 Mode 2 interface of WD 22a. The WD 22a may provide the source used by the WD 22a for position determination and other related information. The WD 22a may also scan for positions of surrounding WDs.

When the WD state is state 4, the WD 22a has determined, such as via WD interface selection unit 30a in processing circuitry 58, processor 60, sidelink interface 54, radio interface 52, that cellular coverage status is out of coverage and that local positioning information is inaccurate or obsolete. The WD 22a selects as the communication interface 54 a PC5 Mode 2 interface and transmits, via the selected PC5 Mode 2 interface of WD 22a, at least a warning signal indicating that the WD position is unknown, i.e., to at least notify surrounding WDs of the presence of a WD without position information, using Mode 2/D2D broadcast. The network node 16 marks the position of WD 22a as unknown.

Additionally, when the WD state is state 3 or 4, the WD 22a may attempt to acquire an WD absolute position by cooperating with other WDs, exchanging available position data, and performing measurements on D2D signals. Further, a WD 22a that is within cellular coverage, e.g., having in coverage cellular coverage status, may receive a broadcast message from another WD 22b that is out of coverage and may relay the broadcast message or some of the contents of the broadcast message to the network node 16. Relaying the broadcast message or some of the contents of the broadcast message to the network node 16 helps the network node 16 to maintain an accurate state of the WDs 22, e.g., in accordance with Table 2.

In some embodiments, the actions performed by the WD 22, the surrounding WDs 22, and/or the network node 16 facilitates safety-related services.

Example Configuration and Operation in Various WD States.

Due to mobility, spotty cellular coverage, or spotty GNSS coverage, availability of onboard sensors, a plurality of WDs 22 may be in different states at a given time. In addition, the number of WDs 22 of the plurality of WDs 22 may change with time. As such, it is important that state transitions of WDs 22 are smooth and that WDs 22 in different states exchange cellular and/or sidelink messages.

Figure 6:
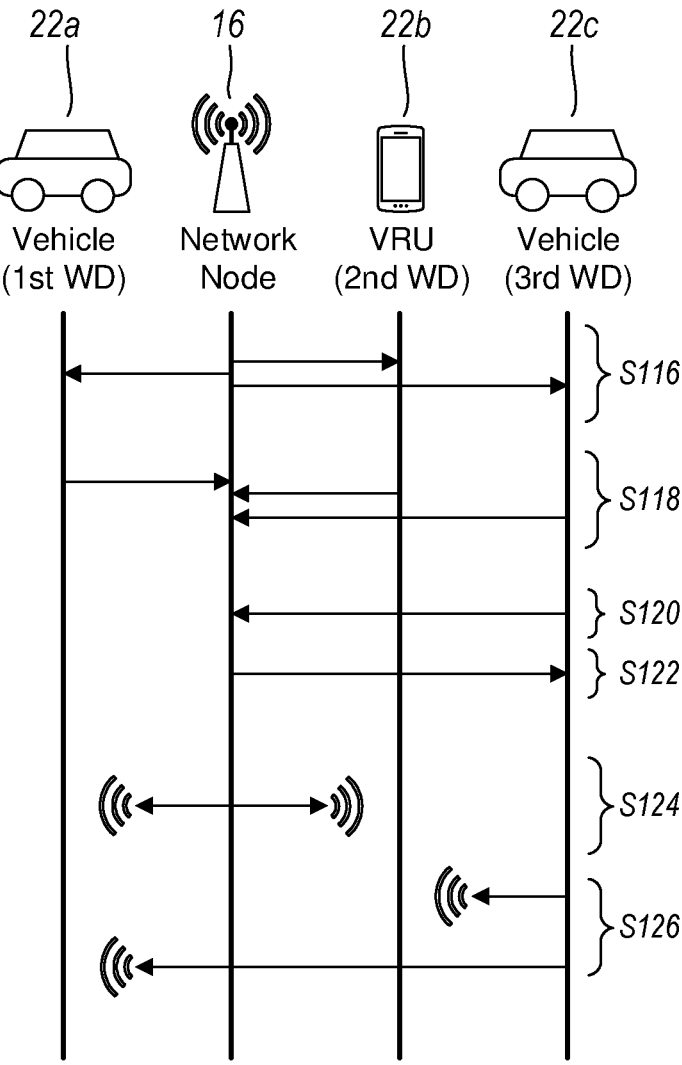
FIG. 6 is a flow diagram of an example configuration and operation illustrating different states according to the principles of the present disclosure.

An example method providing configuration and operation of multiple WDs 22 according to the principles in the present disclosure is described with respect to the flow diagram of FIG. 6. The example method includes a network node 16, a first WD 22a (e.g., a vehicle engaged in V2X), a second WD 22b (e.g., a VRU), and a third WD 22c (e.g., a vehicle having a WD inside). One or more Blocks and/or functions and/or methods performed by network node 16 may be performed by one or more elements of network node 16 such as by remote interface selection unit 28 in processing circuitry 42, processor 44, communication interface 34, radio interface 36, etc. One or more Blocks and/or functions and/or methods performed by the WDs 22a, 22b, and 22c may be performed by one or more elements, or one or more elements similar/similar in function to one or more elements, of WD 22a such as by WD interface selection unit 30a in processing circuitry 58, processor 60, sidelink interface 54, radio interface 52, etc. Although all of the steps, S116-S126, of the example method may be performed, the steps are not necessarily performed in a particular order, nor are all of the steps required to be performed.

The example method includes the network node 16 configuring (S116) WDs 22a, 22b, and 22c, such as via remote interface selection unit 28 in processing circuitry 42, processor 44, communication interface 34, radio interface 36, to create and maintain status information at each WD, including local positioning information, cellular coverage status, and state of the WD. The WDs 22a, 22b, and 22c may also use subscription or preconfigured data to create and maintain status information, for example, in order to control, such as via WD interface selection unit 30 in processing circuitry 58, processor 60, sidelink interface 54, radio interface 52, how WD state transitions take place (e.g., when a WD should mark the WD position estimate as up-to-date or obsolete). Configuration information to create and maintain status information at each WD may further specify transmitting WD position, local positioning information, cellular coverage status, and/or WD state, in accordance with a reporting mode selected. Reporting modes include single-report request, periodic, event triggered, and event-triggered-periodic.

The example method further includes the WDs 22a, 22b, and 22c transmitting (S118) to the network node 16, such as via WD interface selection unit 30 in processing circuitry 58, processor 60, sidelink interface 54, radio interface 52, status and state information, including a WD position, local positioning information, cellular coverage status, WD state, timing information related to the local positioning information, source of local positioning information, and/or accuracy of the local positioning information. The example method also includes the third WD 22c determining state and status information and reporting/transmitting (S120), such as via WD interface selection unit 30 in processing circuitry 58, processor 60, sidelink interface 54, radio interface 52, the determined state and status information to the network node 16, such as transmitting a position warning signal (e.g., WD state is state 2).

In addition, the example method includes the network node 16 marking (S122), such as via remote interface selection unit 28 in processing circuitry 42, processor 44, communication interface 34, radio interface 36, the WD position of the third WD 22c as uncertain/obsolete/unknown and/or transmitting (S122), such as via remote interface selection unit 28 in processing circuitry 42, processor 44, communication interface 34, radio interface 36, to the third WD 22c a DL PRS. The example method also includes the network node 16 broadcasting (S124), such as via remote interface selection unit 28 in processing circuitry 42, processor 44, communication interface 34, radio interface 36, information to the WDs 22a, 22b, and 22c informing the WDs 22a, 22b, and 22c to listen to Mode-2 signals from surrounding WDs and/or indicating sidelink resource pools.

The example method further includes the third WD 22c switching to Mode-2 interface (according to State 3 or State 4 of Table 2) to broadcast (S126), such as via WD interface selection unit 30 in processing circuitry 58, processor 60, sidelink interface 54, radio interface 52, to the first and the second WDs 22a and 22c status and state information, which may include a WD position, local positioning information, cellular coverage status, WD state, timing information related to the local positioning information, source of local positioning information, and/or accuracy of the local positioning information. The network node 16 may also allocate specific resource pools specifically for Mode 2 position broadcast information.

As will be appreciated by one of skill in the art, the concepts described herein may be embodied as a method, data processing system, and/or computer program product. Accordingly, the concepts described herein may take the form of an entirely hardware embodiment, an entirely software embodiment or an embodiment combining software and hardware aspects all generally referred to herein as a "circuit" or "module." Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

It will be appreciated by persons skilled in the art that the embodiments described herein are not limited to what has been particularly shown and described herein above. In addition, unless mention was made above to the contrary, it should be noted that all of the accompanying drawings are not to scale. A variety of modifications and variations are possible in light of the above teachings without departing from the scope of the following claims.

What is claimed is:

1. A method for a wireless device (WD) for selecting a communication interface, the WD supporting communication with a network node, the method comprising:

determining a WD positioning information status and a cellular coverage status;

determining a WD state based on the determined WD positioning information status and the cellular coverage status;

transmitting position information based on the determined WD state; and selecting the communication interface based at least in part on the determined WD state, wherein the cellular coverage status is one of in coverage and out of coverage, and the WD positioning information status is one of up-to-date and obsolete, and wherein the determined WD state is:

state 1 when the cellular coverage status is in coverage and the WD positioning information status is up-to-date;

state 2 when the cellular coverage status is in coverage and the WD positioning information status is obsolete;

state 3 when the cellular coverage status is out of coverage and the WD positioning information status is up-to-date; and state 4 when the cellular coverage status is out of coverage and the WD positioning information status is obsolete.

2. The method of claim 1, further comprising:

receiving a configuration that specifies how the WD positioning information status, the cellular coverage status, and the WD state are determined; and creating a state information table based at least on the received configuration.

3. The method of claim 2, wherein the configuration further specifies transmitting the position information in accordance with a reporting mode selected from one of single-report request, periodic, event triggered, and event-triggered-periodic.

4. The method of claim 2, wherein the received configuration is one of a configuration received from the network node, a configuration based at least on subscription data, and a configuration based at least on preconfigured data.

5. The method of claim 1, wherein transmitting the position information further includes:

when the WD state is state 1, transmitting a position report including a WD position;

when the WD state is state 2, transmitting a position warning and a network support request;

when the WD state is state 3, transmitting an estimated WD position using a Mode 2 broadcast and scanning for positions of surrounding wireless devices; and when the WD state is state 4, transmitting a warning signal using the Mode 2 broadcast, the warning signal indicating that the WD position is unknown.

6. The method of claim 5, wherein selecting the communication interface further includes:

when the WD state is state 1, selecting as the communication interface one of a cellular interface (Uu), a Direct Communication (PC5) Mode 1 interface, and a PC5 Mode 2 interface, the communication interface selection being based at least in part on one of a received selection made by the network node and a selection made by the WD, the communication interface being selected to transmit at least the position report;

when the WD state is state 2, selecting as the communication interface one of the Uu interface, the PC5 Mode 1 interface, and the PC5 Mode 2 interface, the communication interface selection being based at least in part on one of the received selection made by the network node and the selection made by the WD, the communication interface being selected to transmit at least the position warning and the network support request;

when the WD state is state 3, selecting as the communication interface the PC5 Mode 2 interface, the communication interface selection being made by the WD, the communication interface being selected to transmit at least the estimated WD position using a Mode 2 broadcast and to scan for positions of surrounding wireless devices; and when the WD state is state 4, selecting as the communication interface the PC5 Mode 2 interface, the communication interface selection being made by the WD, the communication interface being selected to transmit at least the warning signal indicating that the WD position is unknown using the Mode 2 broadcast.

7. The method of claim 5, wherein the network support request includes a request to the network node to transmit one of a Down Link Positioning Reference Signal (DL PRS) and Real-Time Kinematic (RTK) assistance data.

8. The method of claim 5, wherein the WD position is determined based at least on information provided by a position-determining source including at least one of a Down Link Positioning Reference Signal (DL PRS), a Global Navigation Satellite System (GNSS), and at least one WD sensor.

9. The method of claim 8, wherein the transmitted position information further includes the WD state and the position-determining source utilized to determine the WD position.

10. The method of claim 1, wherein determining the cellular coverage status is based at least in part on a predefined threshold.

11. The method of claim 1, further comprising:
receiving a request from the network node to listen to Mode 2 signals from WDs surrounding the WD; and
receiving indications of sidelink resources pools.

12. A method for a network node for selecting a communication interface of a wireless device (WD), the network node supporting communication with the WD, the method comprising:
determining a WD positioning information status and a cellular coverage status of the WD;
determining a WD state based on the determined WD positioning information status and the cellular coverage status;
performing a network action based on the determined WD state; and selecting the WD communication interface based at least in part on the determined WD state, wherein the cellular coverage status is one of in coverage and out of coverage, and the WD positioning information status is one of up-to-date and obsolete, and wherein the determined WD state is:

state 1 when the cellular coverage status is in coverage and the WD positioning information status is up-to-date;

state 2 when the cellular coverage status is in coverage and the WD positioning information status is obsolete;

state 3 when the cellular coverage status is out of coverage and the WD positioning information status is up-to-date; and state 4 when the cellular coverage status is out of coverage and the WD positioning information status is obsolete.

13. The method of claim 12, further comprising:
transmitting to the WD a configuration that specifies how the WD positioning information status, the cellular coverage status, and the WD state are determined.

14. The method of claim 13, wherein the configuration further specifies transmitting position information by the WD in accordance with a reporting mode selected from one of single-report request, periodic, event triggered, and event-triggered-periodic.

15. The method of claim 12, wherein performing the network action further includes:
when the WD state is state 1, requesting the WD to send a position report including a WD position;
when the WD state is state 2, marking the WD position as uncertain and providing a network support;
when the WD state is state 3, marking the WD position as unknown; and
when the WD state is state 4, marking the WD position as unknown.

16. The method of claim 15, wherein selecting the WD communication interface further includes:
when the WD state is state 1, selecting as the WD communication interface one of a cellular interface (Uu), a Direct Communication (PC5) Mode 1 interface, and a PC5 Mode 2 interface, the selected WD communication interface being signalable to the WD to cause the WD to transmit at least the position report; and
when the WD state is state 2, selecting as the WD communication interface one of the Uu interface, the PC5 Mode 1 interface, and the PC5 Mode 2 interface, the selected WD communication interface being signalable to the WD to cause the WD to transmit at least a position warning and a network support request.

* * * * *